United States Patent
Fleck

(10) Patent No.: US 7,041,157 B1
(45) Date of Patent: May 9, 2006

(54) FILTER SYSTEM FOR SPREADING SOOT PARTICLES FROM A STREAM OF EXHAUST GAS

(76) Inventor: Carl Maria Fleck, Doktorberg 23 ES, A-2391 Kaltenleutgeben (AT)

(*) Notice: Subject to any disclaimer, the term of this patent is extended or adjusted under 35 U.S.C. 154(b) by 599 days.

(21) Appl. No.: 10/129,605

(22) PCT Filed: Nov. 9, 2000

(86) PCT No.: PCT/AT00/00294

§ 371 (c)(1),
(2), (4) Date: May 8, 2002

(87) PCT Pub. No.: WO01/34281

PCT Pub. Date: May 17, 2001

(30) Foreign Application Priority Data

Nov. 10, 1999 (AT) .................... 1897/99

(51) Int. Cl.
*B01D 46/00* (2006.01)
*B03C 3/66* (2006.01)

(52) U.S. Cl. .............. 95/273; 95/1; 95/2; 95/4; 95/5; 95/8; 95/14; 95/19; 95/20; 95/278; 96/15; 96/18; 96/19; 96/20; 96/54; 96/76; 96/80; 96/417; 96/420; 96/421; 55/282.2; 55/282.3; 55/385.3; 55/523; 55/DIG. 10; 55/DIG. 30; 60/275; 60/311

(58) Field of Classification Search .............. 55/282.2, 55/282.3, 385.3, 523, DIG. 10, DIG. 30; 60/275, 276, 311; 95/1, 2, 3, 4, 5, 8, 14, 95/19, 20, 273, 278; 96/15, 18, 19, 20, 54, 96/75, 76, 80, 417, 420, 421
See application file for complete search history.

(56) References Cited

U.S. PATENT DOCUMENTS

| 4,376,637 | A | * | 3/1983 | Yang ..................... 55/DIG. 30 |
| 4,417,908 | A | * | 11/1983 | Pitcher, Jr. ................... 55/523 |
| 4,897,096 | A | * | 1/1990 | Pischinger et al. ........... 60/311 |
| 4,979,364 | A | * | 12/1990 | Fleck ..................... 55/DIG. 30 |
| 5,034,023 | A | * | 7/1991 | Thompson ................... 55/523 |
| 5,141,714 | A | * | 8/1992 | Obuchi et al. ......... 55/DIG. 30 |

(Continued)

FOREIGN PATENT DOCUMENTS

EP 0 327 799 1/1989

(Continued)

*Primary Examiner*—Jason M. Greene
(74) *Attorney, Agent, or Firm*—Collard & Roe, P.C.

(57) ABSTRACT

An apparatus for separating and converting exhaust particulates from a stream of exhaust gas, especially a diesel engine, into gaseous substances, in which the exhaust gas is guided through a honeycomb filter (6) made from a porous ceramic material whose axially extending channels (1, 2) are open merely at one face side of the filter and are closed off at the respective other face side, and a voltage is applied to electrodes (3, 4) extending parallel to the channels (1, 2) of the honeycomb filter (6). The closure of the channels (1, 2) at the face side is made in such a way that the channels (1, 2) each extending at the same normal distance from one of the electrodes (3, 4) are either all open or all closed off at their face side (9). The channels (1, 2) are mutually offset in a brickwork-like way. A sequence of voltage pulses is applied to the electrodes (3, 4) which produces electron emissions in the channels (1, 2), with pauses remaining between the individual pulses in which an electron emission is omitted.

13 Claims, 3 Drawing Sheets

U.S. PATENT DOCUMENTS

| | | | |
|---|---|---|---|
| 5,202,547 A * | 4/1993 | Abe et al. | 55/DIG. 30 |
| 5,402,639 A * | 4/1995 | Fleck | 55/DIG. 30 |
| 5,405,422 A * | 4/1995 | Ueda et al. | 55/282.3 |
| 5,436,216 A * | 7/1995 | Toyao et al. | 55/523 |
| 5,853,437 A * | 12/1998 | Peter et al. | 55/282.3 |
| 5,893,267 A | 4/1999 | Vogtlin et al. | |
| 6,660,061 B1 * | 12/2003 | Josephson et al. | 55/282.3 |
| 6,660,068 B1 * | 12/2003 | Garner et al. | 55/523 |

FOREIGN PATENT DOCUMENTS

| | | |
|---|---|---|
| EP | 0 332 609 | 3/1989 |
| WO | WO 91/16528 | 10/1991 |

* cited by examiner

FILTER SYSTEM FOR SPREADING SOOT PARTICLES FROM A STREAM OF EXHAUST GAS

CROSS REFERENCE TO RELATED APPLICATIONS

Applicant claims priority under 35 U.S.C. §119 of Austrian Application No. A 1897/99, filed on Nov. 10, 1999. Applicant also claims priority under 35 U.S.C. §120 of PCT/AT00/00294, filed on Nov. 9, 2000. The international application under PCT article 21(2) was not published in English.

BACKGROUND OF THE INVENTION

1. Field of the Invention

The invention relates to a filter arrangement for separating and converting exhaust particulates from a stream of exhaust gas and its operation.

2. Description of the Prior Art

In the apparatus as known from U.S. Pat. No. 5,141,714 the exhaust particulates are separated at the pore borders of porous ceramics and incinerated from time to time by applying a voltage to the electrodes of the filter. Whereas the separation of the exhaust particulates therefore occurs substantially mechanically, the applied direct voltage is used for the thermal incineration of the deposited particulates, which is caused by the relatively high currents over the conductive exhaust particulate deposits.

In an alternative embodiment, the porous ceramics are penetrated by axially extending channels through which exhaust gas is conducted. The channels are open at one end and closed off at the other end. The state of the art provides to distribute the channels in a chessboard-like manner, which channels are open and closed at one and the same face side and are substantially square in their shape. Pressure differences thus build up over all four walls of each channel, so that the exhaust gas flows through all four walls of each channel and exhaust particulates contained therein are deposited about the pores of said walls. In the case of an application of a direct voltage for the purpose of thermal incineration of the exhaust particulate deposits, high local temperatures occur within the entire honeycomb body, which places high stresses on the filter material. Moreover, this type of exhaust particulate incineration is linked to a high input of energy.

In order to reach the temperature required for incinerating the deposited exhaust particulates, it is also known to use an additive and a subsequent injection of fuel, which is only possible by a common-rail injection system, and the arrangement of an additional catalyst.

This discontinuous regeneration is not only very complex, but may fail completely under extreme cold and thus lead to a complete failure of the diesel vehicle.

In the method as described in AT 404 285 B (EP 0 332 609 A), the exhaust particulate is separated by an electric direct voltage field following a charging in the channels which are opened on either side of a honeycomb body made of a dense ceramic material and is oxidized continuously in an electrochemical manner by a gas plasma into carbon dioxide which is excited by the separating field. Within the scope of the geometry of the channels which are open on either side, said direct voltage field has the task on the one hand to ensure the separation of the exhaust particulates and on the other hand to ensure the incineration of the separated particulates. The latter requires the use of high direct voltages, which may lead to structural damage to the honeycomb filter, especially in cases when the undesirable formation of a spark occurs.

SUMMARY OF THE INVETION

It is the object of the present invention to avoid such disadvantages and to provide a filter arrangement of the kind mentioned above in which a sufficient exhaust particulate separation is given under all conditions and even in the case of sudden load changes.

The above object is accomplished according to one aspect of this invention with a filter arrangement for separating and converting exhaust particulates from a stream of exhaust gas into gaseous substances, in which the exhaust gas is guided through axially extending channels of a honeycomb filter made from a porous ceramic material and a voltage is applied to electrodes extending parallel to the channels, which electrodes produce in the channels an electric field extending perpendicularly to its longitudinal extension, characterized in that the channels of the honeycomb filter are open merely at one face side of the filter while being closed off at an opposite face side thereof, such that the channels extending at the same normal distance from one of the electrodes are either all open or all closed off at a respective one of the face sides, and the voltage source supplies an electric pulse field.

According to another aspect, the invention provides a method for the operation of the filter arrangement, which is characterized in that high-frequency voltage pulses are applied to the electrodes to prodi ce in the channnels an electric pulse field extending perpendicularly to the longitudinal extension of the channels.

As a result of the proposed measures, the exhaust particulates are held back mechanically in the walls of the honeycomb body which extend parallel to the electrodes, with the separation of the exhaust particulates also being supported by the electric field formed as a result of the voltage pulses. At the same time, a conversion and oxidation of the exhaust particulates into carbon dioxide occurs as a result of the electric field occurring in pulses and the thus linked emission and acceleration of electrons, leading to a regeneration of the filter, so that the same can no longer be clogged. The exhaust particulate incineration therefore does not occur by mere heating and thus thermal incineration of the exhaust particulates, but instead by way of massive electron bombardment within the channels.

This procedure requires a high-voltage capability of the honeycomb filter, however. It is therefore decisive to correctly choose the arrangement of the alternatingly open and closed channels. Instead of the initially mentioned chessboard-like distribution of the channels which are either open or closed on their face side, it is far better if the channels which each extend at the same normal distance from the electrode are either all open or all closed on their face side. As a result of this arrangement of the closed and opened channels as provided on the inflow side of the exhaust gas it is achieved that there is no pressure difference between adjacent channels which each have the same normal distance from the electrodes and that therefore the exhaust particulates are only deposited in walls of the channels which extend substantially parallel to the electrodes, as a result of which the electric resistance of said walls decreases. These walls of mutually adjacent channels through which the actual passage of the exhaust particulates occurs each lie at the same potential, so that the decrease of the electric resistance is irrelevant, whereas the walls which extend perpendicular to the electrodes do not accumulate exhaust particulates and their electric resistance therefore remains substantially at the same level and no substantial current flow is obtained through said walls. In this way the required electrical power remains low and allows charging the honeycomb filter with pulses. The duration of the pulses and the interposed pauses can vary over a wide range.

In determining the pulse duration of the individual voltage pulses it is recommended to observe the following limiting conditions in order to optimize the properties of the produced pulse field plasma for its application in ceramic honeycomb filters:

The electrons emerging from one of the walls of the channel must be able to reach the opposite wall within the pulse duration, and the pulse duration must not allow the formation of an auxiliary spark ("streamer").

In order to asses a lower threshold $\tau_1$ of the pulse duration from the geometrical conditions of the honeycomb filter, it is necessary that the paths of the electrons in the exhaust gas are longer during a pulse width than the distance of the walls in the direction of the field, therefore $$\omega.E.\tau_1 > d$$

with $\omega$ [cm²/Vs] meaning the mobility of the free electrons in the electric field, E [V/cm] meaning the electric field strength, $\tau_1$ [sec] the pulse duration and d [cm] the distance between the channel walls in the direction of the field.

If a major part of the formed electrons is to be utilized for the oxidation of the exhaust particulates, this condition must be intensified to $$\omega.E.\tau_1 >> d$$

The mobility $\omega$ of the free electrons in a higher electric field is approx.

$$\omega \approx 10^{+3}/cm^2/Vs/$$

so that the first condition to the inequation is $$E.\tau_1/d >> \omega^{-1}/Vs/cm^2$$

or, if it is inserted for $\omega$ and transformed according to $\tau$, $$\tau_1 >> 10^{-3} \, d/E/s/$$

The second condition must be determined experimentally, because it is determined by the number of porous ceramic separation walls of the honeycomb body. Without such separation walls the time for the formation of an auxiliary spark is approx. between 0.2 us and 0.5 µs. As a result of the numerous separation walls between the channels of a honeycomb body the following open interval can be estimated for the permitted upper threshold $\tau_2$ of the pulse width $\tau$ and within the scope of realistic field strengths:

$$5.10^{-6} > \tau_2 > 2.10^{-6}/s/$$

After experimental clarification of the above threshold $\tau_2$ of the pulse width $\tau$ one obtains the following limitation $$5.10^{-6} > \tau >> 10^{-3} \, d/E/s/$$

which in respect of the ratio d/E can be chosen at will. Since for reasons of the overall size and the entire filter surface d can appropriately be chosen with approx. 0.1 cm, one obtains $$5.10^{-6} > \tau >> 10^{-4}/E/s/$$

and at a pulse field strength of approx. 3 kv/cm $$5.10^{-6} > \tau >> 3.10^{-8}/s/,$$

so that the pulse width of a unipolar pulse or the unipolar pulse share of a bipolar pulse with a field amplitude of approx. 3 kV/cm is available for an efficient incineration of the exhaust particulates within the following open interval:

$$5.10^{-6} > \tau > 10^{-7}/s/,$$

i.e. approximately between 0.1 us and 5 µs.

If the high-frequency voltage pulses are applied with different polarity to the electrodes, with the change of the polarity occurring after a specific number of pulses, the exhaust particulates will be charged prior to their entrance in the honeycomb filter, which leads to an improvement of the spearation of the exhaust particulates.

This also leads to the advantage that the separation of the exhaust particulates can be influenced by the field pulses and it is ensured through a change of the polarity that they are separated on both separation walls of each channel which extend parallel to the electrodes and are oxidized by the produced plasma. The change of polarity can occur after each individual pulse or also after a certain number of pulses.

The voltage pulses producing an electron emission or a considerable acceleration of the electrons can also be modulated as high-frequency pulses onto a sequence of bipolar low-frequency pulses with a pulse duration of at least 10 ms. The pulse duration of the low-frequency pulses can also be 2 to 3 seconds. It merely needs to be ensured that the voltage applied to the electrodes decreases to such an extent so as to avoid a relevant electron emission or acceleration of the same in the channels of the honeycomb body. The change of the polarity of the high-frequency voltage pulses can occur during the change of the polarity of the low-frequency pulses.

The proposed measures ensure that between the adjacent channels which are separated by a wall extending perpendicular to the electrodes no pressure differences will occur and therefore virtually no deposits of exhaust particulates occur in this region of the walls, so that said walls maintain a respectively high electric resistance. As a result, the formation of a respective high electric pulse field is enabled in the interior of the channels due to the voltage pulses applied to the electrodes.

BRIEF DESCRIPTION OF THE DRAWINGS

The invention is now explained in closer detail by reference to the enclosed drawings, wherein.

DESCRIPTION OF THE PREFERRED EMBODIMENTS

Figure 1:
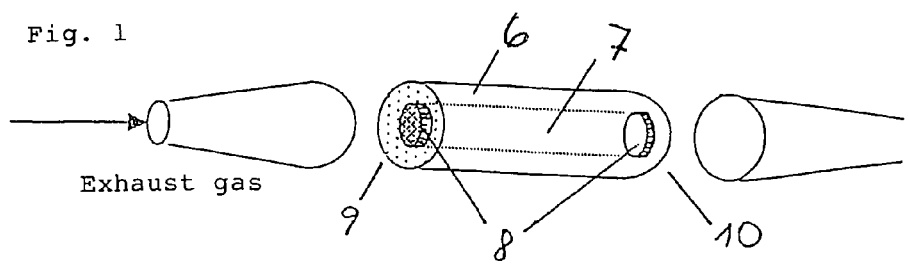
FIG. 1 shows a schematic exploded view of the arrangement of a cylindrical embodiment of the filter between a funnel-like feed line of exhaust gas and a discharge.

FIG. 1 shows the preferred embodiment of the filter in which a cylindrical geometry of the honeycomb body 6 is chosen with a centrical, axially extending bore 7. Said bore 7 is closed off on either side with a plug 8 made of isolating material. Within the hollow chamber thus produced there is an electrode 3 (not shown in FIG. 1) which is fastened to the inner side of the jacket surface of the honeycomb body and is charged via a suitable supply (not shown in FIG. 1) with high voltage. A careful sealing of the bore 7 is decisive in order to prevent the formation of conduction bridges between the electrodes 3 and 4 as a result of exhaust particulate deposits.

Figure 3:
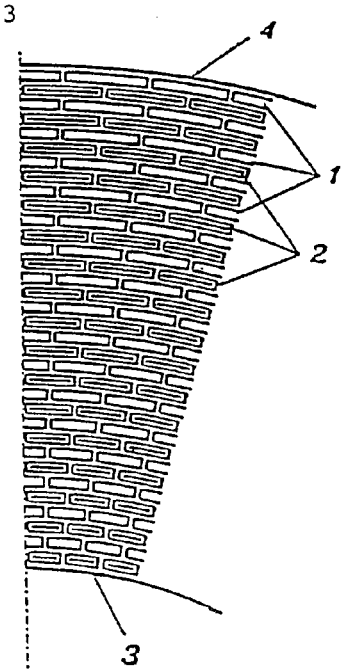
FIG. 3 schematically shows a sectional view from a face view of a honeycomb body according to FIG. 1 for performing the method in accordance with the invention.

As is shown in FIG. 3, which shows a sectional view of the inflow side of a honeycomb body made of a porous ceramic material, channels 1, 2 are either closed off (channels 2) with plugs 5 or open (channels 1) on the inflow side, which channels are each provided with the same normal distance from the electrodes 3, 4 which are disposed on the jacket surfaces.

The clearance of the channels 1, 2, i.e. their cross-sectional extension extending perpendicular to the electrodes 3, 4, is appropriately less than 0.2 cm, preferably less than 0.1 cm, and is therefore smaller than is required for the formation of an auxiliary spark (streamer) with a full ionization field.

Figure 2:
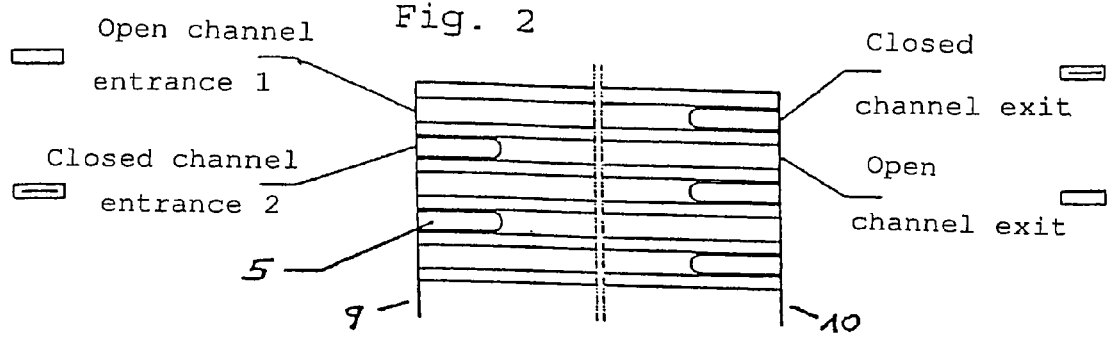
FIG. 2 shows an illustration of the alternatingly open and closed channels for better understanding of the figures below.
Figure 4:
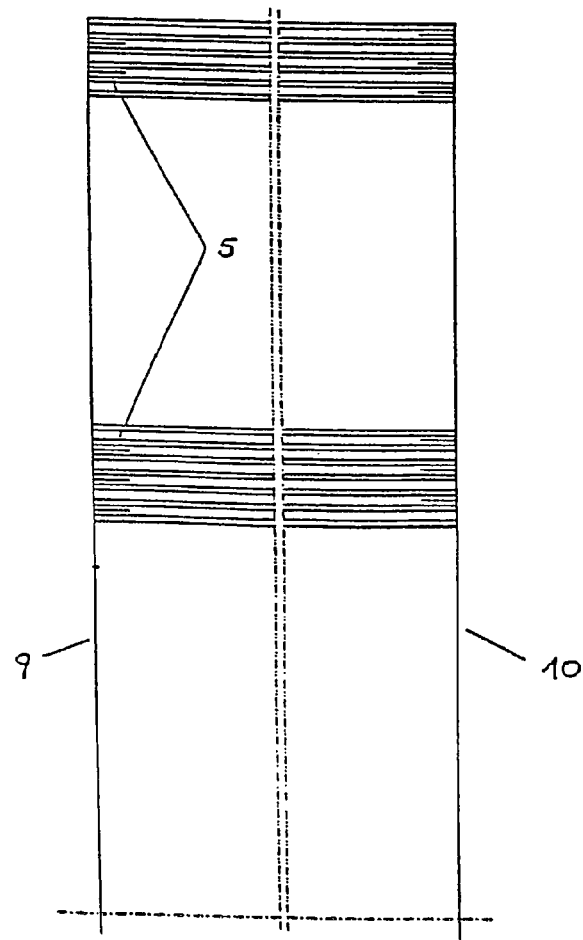
FIG. 4 schematically shows a longitudinal sectional view through a honeycomb body according to FIG. 1.

The mutually adjacent layers of channels 1 and 2 are arranged in a brickwork-like, mutually offset way, with the layers of channels 1 and 2 which at the inflow side 9 are mutually adjacent in the radial direction or in the direction perpendicular to the electrodes 3, 4 being alternatingly closed or open. As is shown from FIGS. 2 and 4, the channels 1 which are open at the inflow side 9 are closed off on the outflow side 10 by plugs 5 and vice-versa. As a result, the exhaust gases flowing through the honeycomb body are forced to flow through the continuous walls extending parallel to the electrodes 3, 4 between the channels 1, 2 which have a different normal distance from the electrodes 3, 4.

Figure 5:
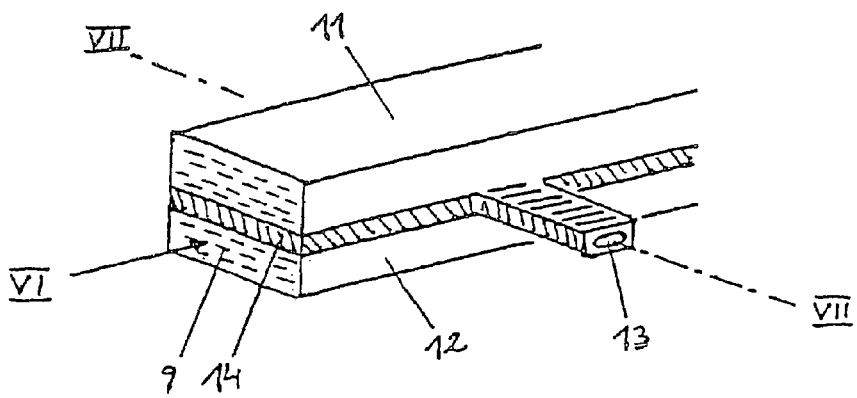
FIG. 5 shows an alternative embodiment of the honeycomb body by using a rectangular cross section.
Figure 6:
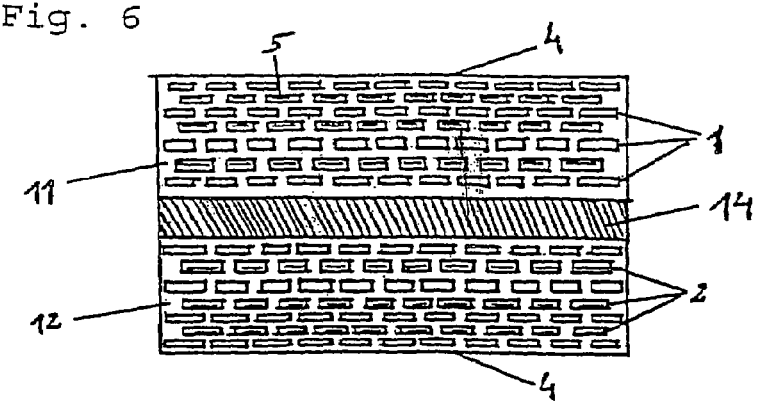
FIG. 6 schematically shows a face view of the honeycomb body along the line VI in FIG. 5.
Figure 7:
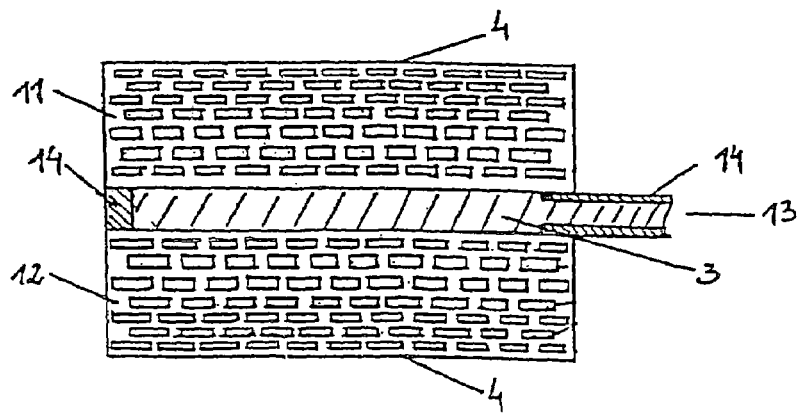
FIG. 7 schematically shows a longitudinal sectional view through a honeycomb body along the line VII—VII in FIG. 5.

FIG. 5 shows an alternative embodiment of the filter in which honeycomb bodies with substantially rectangular cross sections are provided. In this case the inner electrode 3 is disposed between two honeycomb bodies 11, 12 with a respectively rectangular cross section each. The inner electrode 3, which is formed by a conductive ceramic material for example, is completely enclosed by a material 14 such as an isolating ceramic material. As is shown in FIG. 6, the two honeycomb bodies 11, 12 are separated at the face side of the filter by an isolating layer 14. It can be seen further how the channels 1, 2 are mutually offset in a brickwork-like manner and the openings of such channels which show the same normal distance from the isolating separating layer and thus also from the electrode 3 are either all closed off or open. The injection of the high voltage is performed via a feed line 13, as is schematically shown in FIGS. 5 and 7. FIG. 7 shows a cross sectional view along the line VII—VII in FIG. 5. The channels all appear with an open cross section.

Figure 8:
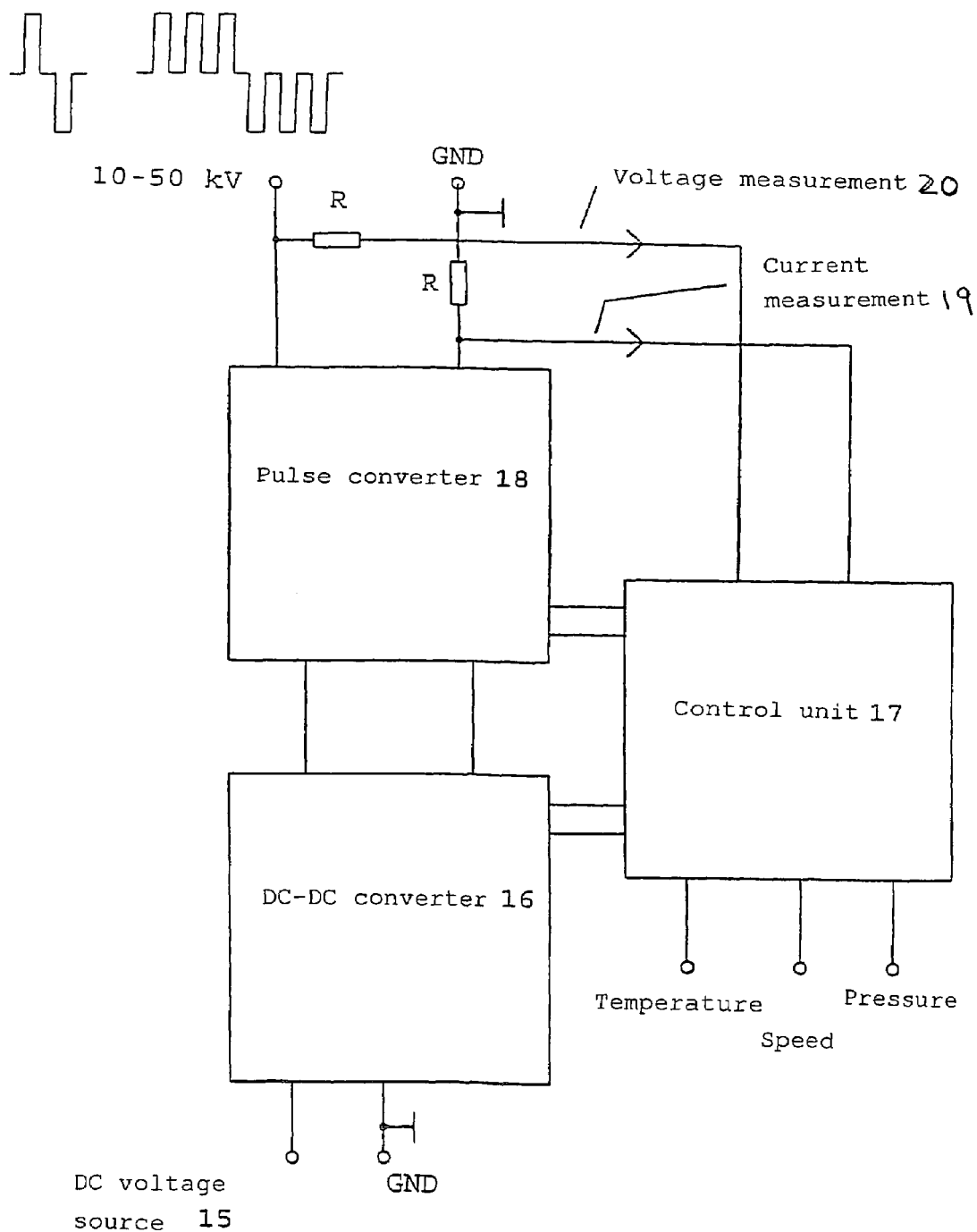
FIG. 8 shows a circuit diagram for producing the pulse sequence for charging the electrodes.

FIG. 8 shows a circuit diagram for producing high-voltage pulses from a direct voltage source 15. The direct voltage, preferably 12–24 V, is supplied to a DC—DC converter 16 which is coupled to a control unit 17. The control unit 17 processes information such as engine-specific data like pressure, speed or temperature. A pulse converter finally forms sequences of pulses in which the polarity of successive pulses either always changes or only after a sequence of pulses of the same polarity. In the circuit as shown in FIG. 8 it is further provided to subject the output signal of the pulse converter 18 to a current and voltage measurement 19, 20 and to process said information in the control unit 17 as well. With the high-voltage pulses of 10–50 kV as supplied by a circuit of this kind, the electrode 3 is preferably charged with the electrode 4 being at ground. Due to these voltage pulses, an electric pulse field forms in the channels 1, 2.

An arc-through of the electric field is prevented in such a way that a high-frequency pulse field is switched on/off either unipolarly or bipolarly, i.e. a pause is inserted both after a unipolar pulse as well as after a bipolar pulse. This pause is used for scattering the ions of the auxiliary spark by drifting in the residues of the electric field and diffusion. If despite these measures sparks do occur, they can be detected and the pauses can be prolonged between the individual pulses in accordance with the invention.

In accordance with the invention, pulses of one polarity can be repeated several times in order to be followed by pulses of other polarity. In particular, high-frequency pulses of one polarity can each sit on a low-frequency pulse of the same polarity, whose polarity also changes with the change of polarity of the high-frequency pulses. The pulse field method in accordance with the invention is particularly advantageous by the prior charging of the exhaust particulates in an electric discharge, because as a result of the contribution of the electric separation in the pulse field which does not deposit the exhaust particulate in the direct vicinity of the pores, both the reversible as well as the irreversible share of the pressure build-up is strongly delayed.

What is claimed is:

1. A filter arrangement for separating and converting exhaust particulates from a stream of exhaust gas into gaseous substances, in which the exhaust gas is guided through axially extending channels of a honeycomb filter made from a porous ceramic material and a voltage is applied to electrodes extending parallel to the channels, which electrodes produce in the channels an electric field extending perpendicularly to its longitudinal extension, characterized in that the channels of the honeycomb filter are open merely at one face side of the filter while being closed off at an opposite face side thereof, such that the channels extending at the same normal distance from one of the electrodes are either all open or all closed off at a respective one of the face sides, and the voltage source supplies an electric pulse field.

2. A filter arrangement as claimed in claim 1, characterized in that adjacent channels which have a different normal distance to one of the electrodes are offset in a brickwork-like manner and the cross-sectional extension of the channels perpendicular to the electrodes is considerably smaller than that parallel thereto.

3. A filter arrangement as claimed in claim 1, characterized in that the honeycomb filter is provided upstream with a device for the electric charging of the exhaust gases.

4. A method for the operation of a filter arrangement for separating and converting exhaust particulates from a stream of exhaust gas into gaseous substances, in which the exhaust gas is guided through axially extending channels of a honeycomb filter made from a porous ceramic material and a voltage is applied to electrodes extending parallel to the channels characterized in that high-frequency voltage pulses are applied to the electrodes to produce in the channels an electric pulse field extending perpendicularly to the longitudinal extension of the channels.

5. A method for the operation of a filter arrangement as claimed in claim 4, characterized in voltage pulses are applied with different polarity to the electrodes, with the change of the polarity after a specific number of pulses.

6. A method for the operation of a arrangement as claimed in claim 4, characterized in that the voltage pulses are used with a duration of $10^{-8}$ to $2.10^{-5}$ seconds, with said pulses producing at 120° C. a field strength of at least 2 kV/cm and at 400° C. a field strength of at least 0.5 kV/cm in the channels of the honeycomb filter.

7. A method for the operation of a filter arrangement as claimed in claim 6, characterized in voltage pulses are used with a duration of $10^{-7}$ to $5.10^{-6}$ seconds.

8. A method for the operation of a filter arrangement as claimed in claim 6, characterized in that at 120° C. the voltage pulses produce a field strength of at kV/cm in the channels of the honeycomb filter.

9. A method for the operation of a filter arrangement as claimed in claim 6, characterized in that at 400° C. the voltage pulses produce a field strength of at least 1 kV/cm in the channels of the honeycomb filter.

10. A method for the operation of a filter arrangement as claimed in claim 4, characterized in that the voltage pulses are used with a pulse duration chosen depending on the mobility of the electrons in the electric field, with the duration τ corresponding to the voltage pulses of the relationship:

$2.10^{-5} \geq \tau \geq d/E.10^{-3}$ cm$^2$/V sec, with d being the width of the channels in the direction of the electric field in cm and E being the field amplitude in V/cm.

11. A method for the operation of a filter arrangement as claimed in claim 10, characterized in pulse duration τ of the voltage pulses corresponds to the relationship $$5.10^{-6} \geq \tau \geq d/E.10^{-3} \text{ cm}^2/V \text{ sec.}$$

12. A method for the operation of a filter arrangement as claimed in claim 4, characterized in that any occurring spark discharges are detected and that, after each spark discharges the duration of the voltage pulses is gradually reduced or the duration of the pauses between two voltage pulses each is increased gradually.

13. A method for the operation of a filter arrangement as claimed in claim 4, characterized in that in the case of low exhaust particulate occurrence, the pause between the voltage pulses are extended, with the pressure drop over the honeycomb filter or specific operational data of the internal combustion engine producing the stream of exhaust gas, including injected quantity, speed and temperature, being detected and evaluated in order to detect the occurrence of exhaust particulates.

* * * * *